United States Patent [19]

Asawa et al.

[11] Patent Number: 4,459,477

[45] Date of Patent: Jul. 10, 1984

[54] MICROBENDING OF OPTICAL FIBERS FOR REMOTE FORCE MEASUREMENT

[75] Inventors: Charles K. Asawa, Pacific Palisades; Joseph W. Austin, Torrance; Michael K. Barnoski; Stewart D. Personick, both of Pacific Palisades; Shi-Kay Yao, Anaheim, all of Calif.

[73] Assignee: TRW Inc., Redondo Beach, Calif.

[21] Appl. No.: 297,051

[22] Filed: Aug. 27, 1981

[51] Int. Cl.³ .............................................. G01L 1/24
[52] U.S. Cl. ..................................... 250/227; 73/705; 350/96.15
[58] Field of Search ............... 250/227, 231 R, 231 P; 73/705, 800; 350/96.15, 96.16; 455/612

[56] References Cited

U.S. PATENT DOCUMENTS

| | | | |
|---|---|---|---|
| 4,182,935 | 1/1980 | Chown | 350/96.15 X |
| 4,253,727 | 3/1981 | Jennhomme et al. | |
| 4,289,398 | 9/1981 | Robichaud | 350/96.15 X |
| 4,342,907 | 8/1982 | Macedo et al. | 250/227 |

FOREIGN PATENT DOCUMENTS 73151  6/1980  Japan ................................... 455/612

OTHER PUBLICATIONS

J. N. Fields et al.: Fiber Optic Pressure Sensor, J. Acoust. Soc. Am. (Mar. 1980) pp. 816-818.

A. R. Nelson et al.: Multiplexing System for Fiber Optic Sensors Using Pulse Compression Techniques, Technical Digest, Third Int'nl Conference on Integrated Optics and Optical Fiber Communication, Apr. 27-29, 1981, Abstract MK4.

M. D. Rourke: Measurement of the Insertion Loss of a Single Microbend, Technical Digest, Third Int'nl Conference on Integrated Optics and Optical Fiber Communication, Apr. 27-29, 1981, Abstract MD3.

Primary Examiner—Edward P. Westin
Attorney, Agent, or Firm—Stuart O. Lowry; Robert M. Wallace

[57] ABSTRACT

A system for remote measurement of structural forces includes a plurality of microbend transducers mounted along the length of the structure for microbending an optical fiber in response to structural forces, such as stress acting upon an oil or gas pipeline or the like. An optical time domain reflectometer (OTDR) has a light source for launching a pulsed optical signal for passage through the fiber and a photodetector for sensing as a function of time the intensity of backscattered light reflected back through the fiber, wherein this sensed time function is correlated directly with discrete longitudinal positions along the length of the fiber and the structure. When one or more of the microbend transducers is activated to induce a microbend in the fiber in response to localized forces acting upon the structure, a portion of the backscattered light is lost at the microbend. This attenuation in backscattered light intensity is sensed quantitatively and positionally identified by the photodetector. Specific preferred constructions for microbend transducers and system arrangements particularly adapted for detecting structural strain in an oil or gas pipeline are disclosed.

27 Claims, 19 Drawing Figures

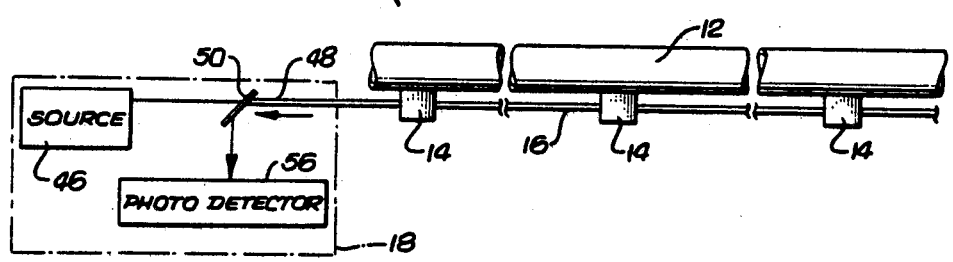
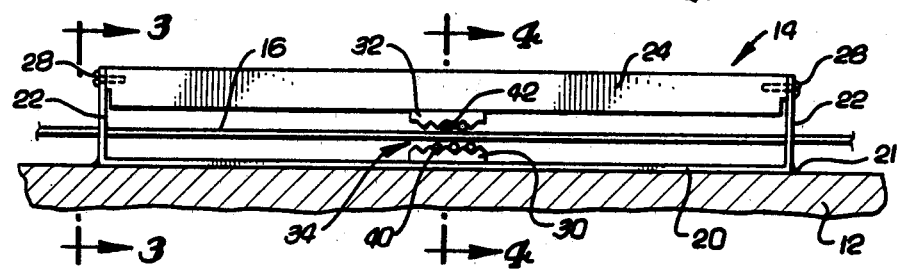
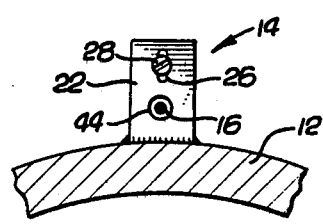
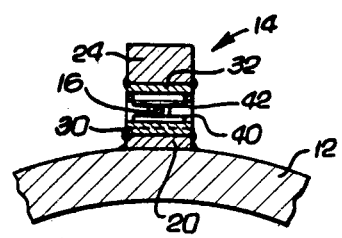
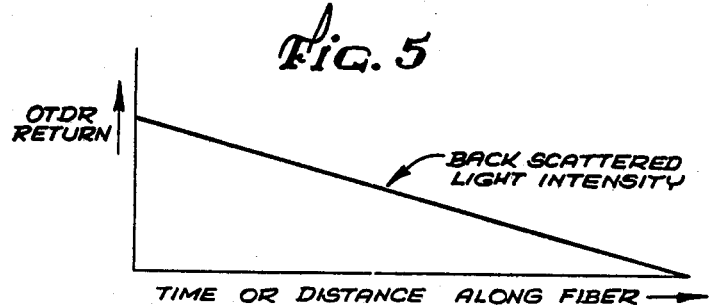

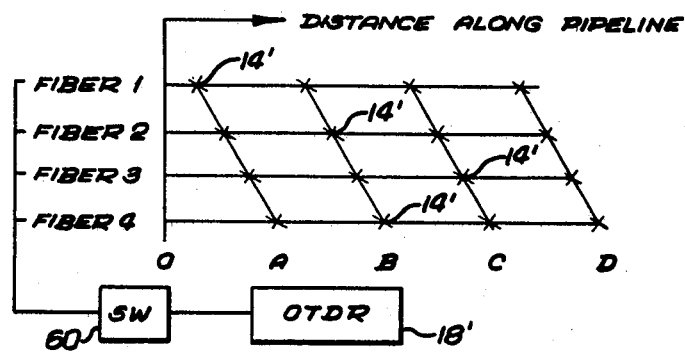
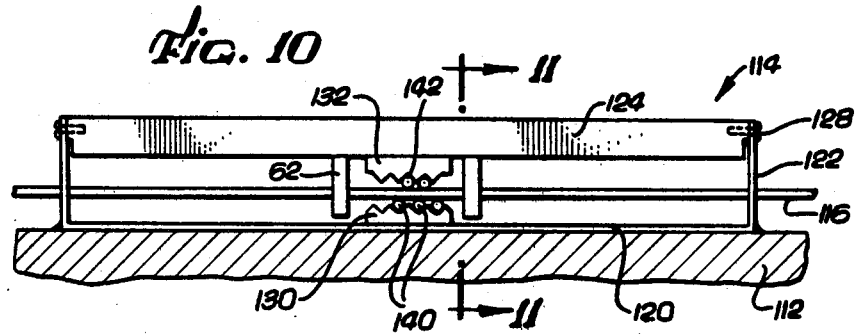
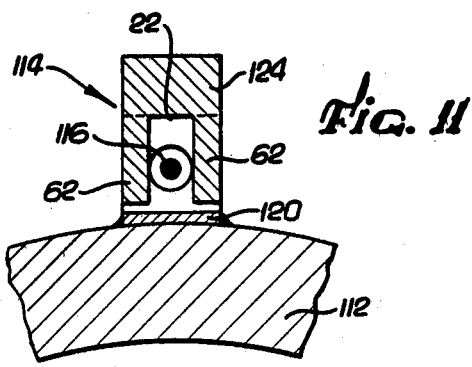
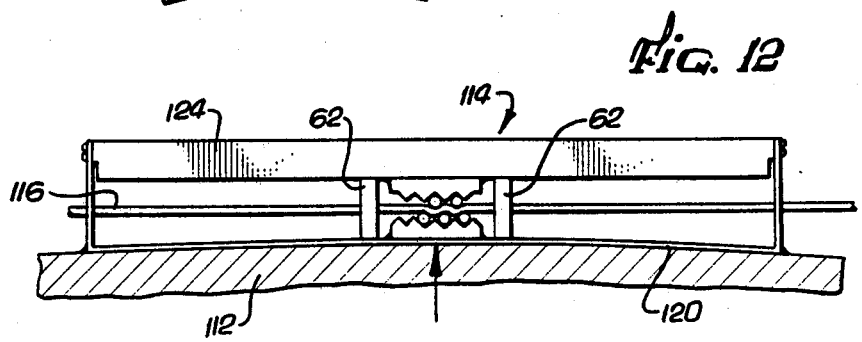

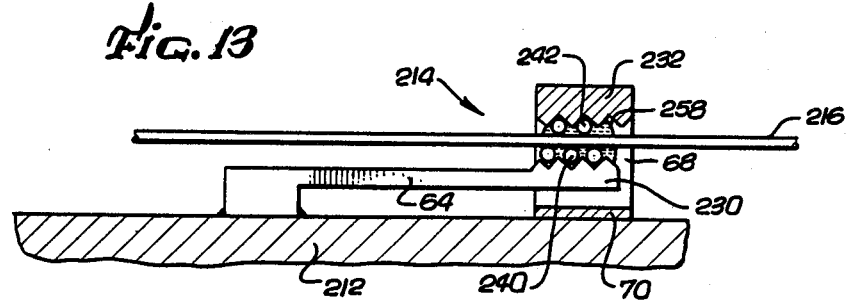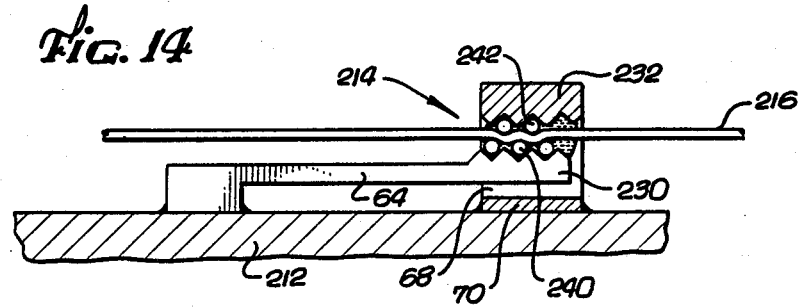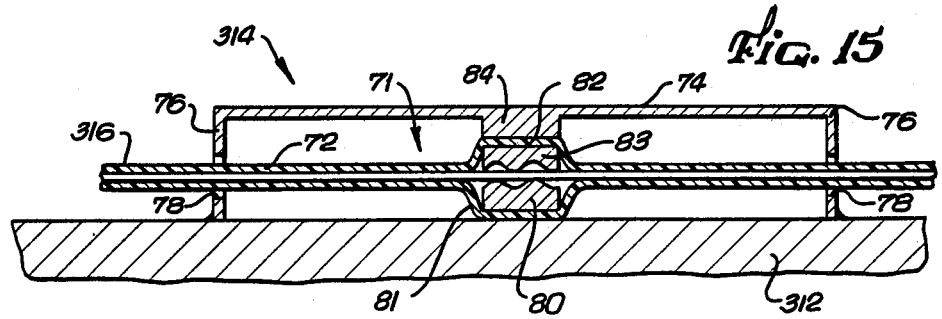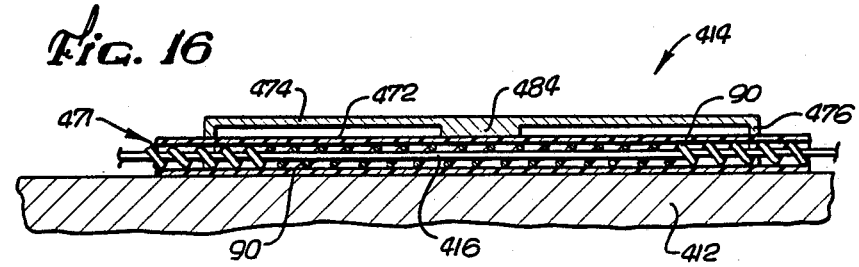

MICROBENDING OF OPTICAL FIBERS FOR REMOTE FORCE MEASUREMENT

BACKGROUND OF THE INVENTION

This invention relates generally to optical fiber systems for detecting forces such as stress acting upon a structure. More specifically, this invention relates to an optical fiber microbend system and components thereof for inducing microbending of the fiber in response to stress in an oil or gas pipeline or the like and for detecting the microbending of the fiber to provide an indication of the location and magnitude of the stress forces.

Optical fibers in general are known in the art, and typically comprise a transparent core of a suitable glass or plastic material which is carried within a relatively thin cylindrical cladding having an index of refraction less than the refractive index of the core. When a light signal such as a collimated beam generated by a laser is focused upon one end of the fiber, the fiber core functions as a waveguide to transmit or propagate the light signal through the core with relatively small internal intensity losses or transmission of the signal to the cladding. An important feature of optical fibers of this type is that gradual turns or bends in the fiber have little or no effect upon transmission of the light signal, thereby permitting transmission of the light signal through the fiber for emission at the opposite end of the fiber regardless of the number of bends and turns. Practical applications of such fibers have included, for example, devices to illuminate or to permit viewing of inaccessible areas, such as areas inside the human body, or as a telecommunications link wherein the light signal is modulated to represent information which can be detected and demodulated at the opposite end of the fiber.

It has been recognized, however, that relatively short bends in an optical fiber can have a significant effect upon the transmissivity of the fiber core. More specifically, the presence of a short bend having a period on the order of a few millimeters, commonly referred to as a microbend, results in an attenuation of the propagated light signal which arises by scattering of a portion of the signal from the fiber core to the cladding from where most of the scattered light portion is lost ultimately to the surrounding environment. In some applications, this attenuation phenomenon is a useful characteristic such as when it is desired to tap or extract a portion of the signal from the fiber without cutting the fiber. In this regard, microbend couplers, such as that described in U.S. Pat. No. 4,253,727 have been proposed for inducing one or more microbends into the fiber to extract a portion of the light signal therefrom, or conversely to input an additional light signal into the fiber. Alternately, in a telecommunications system, the presence of an unwanted microbend coupler to tap information from the fiber can be detected by monitoring signal attenuation.

The concept of optical fiber microbending has also been proposed as a transducer mechanism for sensing and quantifying pressure acting upon a physical structure, such as a diaphragm or pressure plate. In this type of application, a so-called microbend transducer is mounted on the structure for movement therewith in response to pressure to induce microbending of an optical fiber. The microbending causes a detectable attenuation of a light signal passing through the fiber, wherein the degree of attenuation is indicative of the magnitude of pressure. For a discussion of a microbend pressure transducer, see Fields et al.: "Fiber Optic Pressure Sensor", *J. Acoust Soc. Am.*, March, 1980, pages 816–818.

In some environments, it is necessary or desirable to monitor the location and magnitude of selected loads acting upon a physical structure, typically by monitoring a plurality of force transducers mounted along the length of the structure. For example, it is highly desirable to locate and quantify localized stress to which an oil or gas pipeline is subjected, primarily as a result of variations in weather and ground elevation, so that remedial measures can be taken prior to breakage of the pipeline. This problem of pipeline stress is particularly troublesome when the pipeline travels through expansive regions of wilderness or wasteland, such as the so-called Alaskan pipeline which extends for hundreds of miles over relatively unstable tundra. However, for this type of application, conventional transducers such as piezoelectric transducers have not been used because of the hostile conditions to which the transducers would be exposed together with the difficulty in remote monitoring of a large number of the transducers from a single monitoring station. Moreover, while transducers of the microbend type have been proposed for detecting pressure acting upon a structure, no practical and effective system has been proposed or demonstrated for adapting a microbend transducer to a pipeline stress application or for monitoring a large number of microbend transducers from a single monitoring station.

The present invention overcomes the problems encountered in the prior art by providing a practical and effective optical fiber and microbend transducer system for detecting the location and magnitude of forces, such as stress forces, acting along the length of a structure, such as an oil or gas pipeline, wherein a large number of force-responsive microbend transducers are capable of being monitored simultaneously from a single remote monitoring station.

SUMMARY OF THE INVENTION

In accordance with the invention, an optical fiber system is provided for remote measurement of localized forces acting along the length of an elongated structure, such as an oil or gas pipeline. The system includes an optical fiber extending from a conveniently positioned monitoring station into association in series with a plurality of microbend transducers mounted along the length of the structure at selected, longitudinally spaced positions. Each microbend transducer is mounted on the structure in a manner for movably responding to the presence and magnitude of the selected force acting on the structure to induce microbending of the optical fiber.

An optical time domain reflectometer (OTDR) at the monitoring station includes a light source for launching a pulsed light signal through the fiber, and a photodetector for detecting the intensity of backscattered light reflected back through the fiber as a function of time to provide an indication of backscattered light intensity for each point along the length of the fiber. One or more microbends in the fiber induced by the microbend transducers causes a portion of the transmitted and backscattered light to be lost from the fiber at each microbend. This abrupt attenuation in backscattered light intensity at each microbend is sensed by the photodetector which indicates the location and magnitude of the attenuation, thereby identifying the location and magnitude of the force acting upon the structure.

The system is particularly suited for sensing the presence of stress acting upon an oil or gas pipeline, wherein a large number of the microbend transducers are monitored from a single monitoring station. The length of the pipeline which can be monitored is a function of the quality of the optical fiber, the number of tranducers installed along the fiber, and the intensity of the pulsed light signal. In one embodiment, the system can be adapted for monitoring an increased length of the pipeline without improving fiber quality or increasing light signal intensity by providing a plurality of parallel optical fibers each associated with a plurality of microbend transducers mounted along the pipeline. The plurality of fibers can be monitored simultaneously or in sequence with a single optical time domain reflectometer by switching the pulsed light signal from one fiber to another and by reflecting the backscattered light from all of the fibers to the photodetector.

Each microbend transducer, according to one preferred form, comprises a relatively flexible beam secured to the structure and a relatively rigid beam mounted in spaced relation with the flexible beam and the structure. A pair of transducer blocks are respectively mounted on the flexible and rigid beams in closely spaced relation with each other to provide a longitudinally open passage through which the optical fiber extends. The facing surfaces of the transducer blocks are shaped to define a staggered plurality of relatively smooth-surfaced teeth for engaging the fiber when the blocks are moved toward each other to microbend the fiber through a relatively short period on the order of a few millimeters.

In operation, the flexible beam moves with the structure in response to the presence of the force acting upon the structure. When this force moves the flexible beam toward the rigid beam, the transducer blocks are moved toward each other to engage and bend the optical fiber. Such bending, or microbending, causes localized attenuation of transmitted and backscattered light, wherein a portion of the light is scattered from the fiber core to the fiber cladding. The attenuation of backscattered light is located and quantified by the photodetector of the optical time domain reflectometer.

A mode stripper is advantageously associated with the optical fiber at the location of the microbend between the two transducer blocks to strip the portion of the light scattered to the fiber cladding and thereby prevent reflection of any portion of this light back to the fiber core. This mode stripper comprises in one form a selected substance having a generally irregular external configuration and an index of refraction generally matched with or greater than the index of refraction of the fiber cladding such that the light propagated in the cladding is transmitted to the stripper substance where it is ultimately lost. Alternately, if desired, the mode stripper can be provided in the form of an optically black surface coating preferably disposed directly on the fiber at the microbend and in the region of the associated transducer blocks to absorb the portion of the light scattered to the fiber cladding.

Each microbend transducer may additionally include means for adjusting the initial spacing between the transducer blocks to calibrate sensitivity of the transducer in response to movement of the structure. In one arrangement, this adjustment capability is provided by a pair of upstanding supports at opposite ends of the flexible beam wherein these supports include vertically extending slots for reception of fastening means for mounting the rigid beam to the supports. The position of the fastening means along these slots adjustably selects the initial spacing of the two beams and thus also the spacing of the two transducer blocks with respect to each other.

In some systems, it is further desirable to prevent bending of the optical fiber beyond a selected amplitude to prevent excess stress on the fiber and to prevent excess attenuation which might obscure detection of microbending induced by other transducers along the length of the fiber. In one embodiment, this control is provided by one or more stops in the form of lugs projecting from the rigid beam toward the flexible beam. When the fiber is unbent, the lugs are spaced from the rigid beam to permit limited movement of the beams toward each other.

In further system arrangements, the plurality of microbend tranducers installed along the length of a fiber can be adapted for response to movement of the associated structure in any desired direction or a plurality of directions. For example, multiple transducers can be installed in a closely spaced cascaded relation on a pipeline wherein the cascaded transducers are adapted for response to pipeline movement in different directions. If desired, position indicators, such as fiber couplings which create reflection spikes for detection by the photodetector, can be interposed between selected transducers to permit precise identification of the particular transducer responding to pipeline movement.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a schematic diagram illustrating an optical fiber system, including a plurality of microbend transducers, for use in detecting and monitoring of structural forces such as stress acting upon an oil or gas pipeline;

FIG. 2 is an enlarged fragmented side elevation view of one preferred form of a microbend transducer for use with the system of FIG. 1;

FIG. 3 is an enlarged fragmented end elevation view of the microbend transducer, taken generally on the line 3—3 of FIG. 2;

FIG. 4 is an enlarged fragmented vertical section of the microbend transducer, taken generally on the line 4—4 of FIG. 2;

FIG. 5 is a graphical representation of detected optical information when the microbend transducers are in inactive positions as illustrated with respect to the microbend transducer shown in FIG. 2;

FIG. 8 is a graphical representation of a multiple fiber optical system illustrating the use of a plurality of optical fibers each in association with a plurality of microbend transducers for detecting stress at a plurality discrete positions over relatively long lengths of a pipeline or the like;

FIG. 9 is a graphical representation of an alternative multiple fiber optical system for detecting stress over relatively long lengths of a pipeline or the like;

FIG. 10 is a fragmented side elevation view illustrating an alternative embodiment of a microbend transducer for use with the system of FIG. 1;

FIG. 11 is an enlarged fragmented vertical section taken generally on the line 11—11 of FIG. 10;

FIG. 12 is a fragmented side elevation view of the microbend transducer of FIG. 10, and illustrating the transducer in an active position sensing stress acting upon the pipeline;

FIG. 13 is a fragmented side elevation view of a further alternative embodiment of a microbend transducer for use with the system of FIG. 1;

FIG. 14 is a fragmented side elevation view of the microbend transducer of FIG. 13, and illustrating the transducer in an active position sensing stress acting upon the pipeline;

FIG. 15 is a fragmented side elevation view of another alternative embodiment of a microbend transducer for use with the system of FIG. 1;

FIG. 16 is a fragmented side elevation view of an additional alternative embodiment of a microbend transducer for the system of FIG. 1;

DETAILED DESCRIPTION OF THE PREFERRED EMBODIMENT

Figure 6:
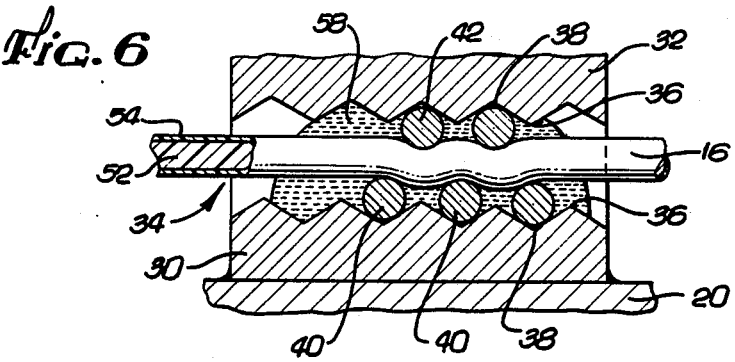
FIG. 6 is an enlarged fragmented longitudinal section of a portion of one of the microbend transducers illustrating the transducer in an active position for bending the optical fiber in response to structural strain acting upon the pipeline.

An optical fiber system 10 is illustrated generally in FIG. 1 for use in detecting, locating, and quantifying forces acting along the length of an elongated structure. The system is illustrated particularly for use in monitoring forces such as structural stresses acting along the length of an oil or gas pipeline 12, although the system can be adapted for monitoring other types of forces and other types of structures, such as, for example, a bridge. As shown, the optical fiber system 10 includes a plurality of microbend transducers 14 mounted at discrete, longitudinally spaced positions along the length of the pipeline 12 in a manner to induce microbending of an optical fiber 16 in response to the presence of localized stress acting upon the pipeline 12. This microbending of the fiber 16 results in an abrupt attenuation of light guided through the fiber wherein the attenuation at one or more of the transducers is located and quantified simultaneously by an optical time domain reflectometer 18 (OTDR) positioned at a convenient monitoring station.

The optical fiber system 10 is particularly suited for remote measurement of forces such as stress at a large number of discrete positions along the length of the oil or gas pipeline 12. That is, it is desirable to monitor localized forces to which an oil or gas pipeline is subjected, such as structural stress acting upon the pipeline resulting primarily from a combination of changing weather conditions and/or gradual shifts in ground elevation, so that appropriate remedial action can be taken to relieve the stress significantly prior to risking breakage of the pipeline. This type of monitoring system is particularly desirable for use with pipelines traveling through desolate or wilderness areas such as the so-called Alaskan pipeline which traverses vast stretches of relatively unstable tundra wherein the tundra commonly experiences significant changes in elevation in response to varying weather conditions. The optical system 10 of the present invention provides a practical and effective system for monitoring of the pipeline at a large number of individually selected positions spaced along a relatively long length of the pipeline wherein the positions are monitored simultaneously by use of a single monitoring device for identifying the location and magnitude of the stress. Accordingly, this permits vast stretches of the pipeline to be monitored from a conveniently positioned monitoring station and when excessive stress is detected at a given location, workmen can proceed directly to the indicated location to take appropriate action to relieve the stress.

The optical system 10 advantageously avoids use of sensitive or expensive transducer mechanisms installed along the length of the pipeline, as well as any requirement for electrical power to be coupled to individual transducer mechanisms. Instead, the system relies upon the use of fiber optics in combination with relatively simple and reliable microbend transducers 14 which are not adversely affected by the hostile environment to which the pipeline may be subjected.

As illustrated in FIG. 1, the optical fiber 16 extends along the length of the pipeline 12 for passage in series through a plurality of the microbend transducers 14. These microbend transducers 14 are physically mounted on the pipeline at selected longitudinally spaced positions for providing response to pipeline stress at a large number of discrete locations along the pipeline. In practice, the spacing between adjacent transducers may vary from less than a meter to significant distances of several meters or more depending upon the determined need for stress monitoring along particular lengths of the pipeline. Moreover, the number of the transducers 14 installed along the fiber 16 may vary from a relatively small number to as many as one hundred or more.

The microbend transducers 14 are designed for movement with their associated localized portions of the pipeline 12 in response to the presence of pipeline strain. This transducer movement is mechanically coupled to the optical fiber 16 to induce bending of the fiber through a relatively small period of say about 1–5 millimeters, commonly referred to as microbending, with the amplitude of fiber bending normally being less than about 100 micrometers and typically on the order of about 5–10 micrometers and correlating directly with the magnitude of pipeline strain. When this occurs, light guided through the fiber 16 is abruptly attenuated at the microbend such that a portion of the guided light is lost. The extent of this attenuation increases with increasing bending amplitude whereby a quantification of the attenuation provides an indication of the magnitude of pipeline strain.

One of the microbend transducers 14 is illustrated, according to one preferred form thereof, in more detail in FIGS. 2-4. As illustrated, the transducer comprises an elongated and relatively thin beam 20 oriented to extend longitudinally with the pipeline 12 and secured to the pipe at a plurality of points along its length such as by means of spot welds, although other means of attachment can be used. This relatively thin beam 20 has sufficient flexibility for movement thereof along with the pipeline 12 when the pipeline assumes a slight radius of curvature along its length in response to stress forces.

The opposite ends of the flexible beam 20 are upturned to provide a pair of supports 22 for mounting of a relatively rigid beam 24 in generally parallel spaced relation with the flexible beam 20. More specifically, the supports 22 are each formed to include an elongated slot 26 extending in a direction away from the flexible beam 20 for reception of a fastening screw 28 which is threaded into the adjacent end of the rigid beam 24. The fastening screw 28 may thus be tightened for bindingly engaging the support 22 to secure the rigid beam 24 in spaced parallel relation with the flexible beam 20, with the magnitude of spacing being controllable according to the position of the screws within the slots.

The flexible and rigid beams 20 and 24 respectively carry a pair of transducer blocks 30 and 32 which are secured to the beams generally near their midpoints in an appropriate manner, such as by welding or the like. These transducer blocks are positioned along the lengths of the beams in a facing and closely spaced relation with each other to define therebetween a relatively narrow vertical passage 34. The facing surfaces of the transducer blocks 30 and 32 have a corrugated or discontinuous profile generally to include transverse ridges 36 separated by transverse channels 38, as shown best in FIG. 6, with the ridges 36 on the lower block 30 desirably being vertically aligned with the channels 38 of the upper block 32. As illustrated in the embodiment of FIG. 2, the ridges and channels of the lower transducer block 30 support a plurality of transversely extending cylindrical pins 40 secured as by welding within two adjacent channels 38, whereas the upper block 32 supports a plurality of transversely extending pins 42 which are located at positions staggered longitudinally between the lower pins 40.

The optical fiber 16 extends through the microbend transducer 14 for bending of the fiber when the transducer responds to a condition of stress on the pipeline 12. More specifically, the fiber 16 extends through a guide hole 44 (FIG. 3) in the support 22 at one end of the transducer, through the narrow vertical passage 34 between the transducer blocks 30 and 32, and further out of the transducer through another guide hole (not shown) in the support 22 at the other end of the transducer. Importantly, when the pipeline is not subjected to stress in the region of the transducer, the vertical clearance provided by the passage 34 is selected by appropriate calibration of the spacing between the two beams 20 and 24 to permit passage of the fiber between the transducer blocks 30 and 32 without significant engagement with or bending of the fiber. Conveniently, when the fiber is relatively taut, the location and size of the guide holes in the supports 22 is selected to retain the fiber within the transverse limits of the transducer blocks 30 and 32.

When the pipeline 12 is subjected to structural stress in the vicinity of one of the microbend transducers 14, the flexible beam 20 moves with the pipeline to accommodate the strain. Typically, this movement of the pipeline and the flexible beam 20 is from the linear configuration, as viewed in FIG. 2, to a nonlinear configuration generally approximating a gradual radius of curvature, wherein the flexible beam 20 moves the lower transducer block 30 relative to the upper transducer block 32. By appropriate positioning of the microbend transducer 14 about the circumference of the pipeline, the relative movement can be selected to cause relative movement of the transducer blocks toward each other for the purpose of bringing the pins 40 and 42 thereon into engagement with the optical fiber 16, as viewed in detail in FIG. 6. For example, portions of the Alaskan pipeline frequently assume upwardly convex geometries as a result of stress arising from a phenomenon known as "frost heave" of the tundra, whereby the microbend transducer 14 is placed on top of the pipeline for movement of the transducer blocks 30 and 32 toward each other with a relative displacement indicative of the magnitude of pipeline strain. Of course, if desired, the transducer can be mounted at any other position about the pipeline for detecting strain acting in other directions. Alternately, the transducers can be adapted for convenient mounting on top of the pipeline and for responding to pipeline movement in other directions, such as horizontally or downwardly. Still further, the transducers can be adapted for response to pipeline movement in more than one direction, if desired.

When the transducer pins 40 and 42 move into engagement with the optical fiber 16, the pins function as teeth to induce a bend having a relatively short period, or microbend, into the fiber. This microbend is shown in somewhat exaggerated form in FIG. 6 as a plurality of quasi-sinusoidal curves or corrugations corresponding generally with the longitudinally staggered positions of the pins, wherein a portion of the light passing through the fiber is attenuated at each curve. The amplitude of the microbends is directly proportional to the magnitude of the stress acting upon the pipeline, and the number of curves induced by the pins is inversely proportional to the required sensitivity of the system for detecting the microbends, as will be described in more detail.

Monitoring of the microbend transducers 14 along the length of the optical fiber 16 is obtained by use of the optical time domain reflectometer 18 at the monitoring station. More specifically, as viewed in FIG. 1, this includes a light source 46 preferably in the form of a laser for generating a pulsed light signal of relatively short duration, typically on the order of about 50-100 nanoseconds, wherein shorter pulses are used for higher system resolution and longer pulses are used for longer lengths of fiber. The pulsed light signal is incident upon the adjacent free end 48 of the optical fiber 16 for passage into and through the optical fiber. Appropriate lens elements (not shown) may be used if desired for focusing the pulsed light signal upon the fiber free end 48. Importantly, the light signal passes from the source preferably without substantial attenuation through an angularly oriented optical element such as a one-way mirror 50, or any other suitable bistable optical multiplexing device, into the optical fiber 16.

According to conventional transmission of light along an optical fiber, the pulsed light signal is guided through a central core 52 (FIG. 6) of the fiber 16 wherein this core is encased within an outer cladding 54 having an index of refraction less than the refractive index of the core. A relatively small portion of this guided or transmitted light is reflected back to the free end 48 of the fiber as a result of internal imperfections inherent within the optical fiber. This reflected portion of the light is referred to as "backscattered light" which has an intensity decreasing along the length of the optical fiber. This decreasing backscattered light intensity is reflected angularly off the downstream face of the one-way mirror 50 for incidence upon a photodetector 56 which forms part of the optical time domain reflectometer 18. Since the light source 46, the one-way mirror 50, and the photodetector 56 are known to those skilled in the art, no further detailed description of these components is provided herein.

In operation, for each pulsed light signal, the photodetector 56 provides an output indicating the backscattered light intensity as a function of time which can be correlated directly with distance along the length of the fiber 16. For example, the reference to FIG. 5, backscattered light reflected from portions of the fiber near the photodetector will be sensed prior to backscattered light reflected from the far end of the fiber. Accordingly, time of reflection and longitudinal position along the fiber can be associated directly with each other, whereby the photodetector output is representative of the backscattered light intensity for each longitudinal position along the fiber. As illustrated, the intensity of the backscattered light normally falls off progressively with increasing distance along the length of the fiber as a result of internal attenuation.

Figure 7:
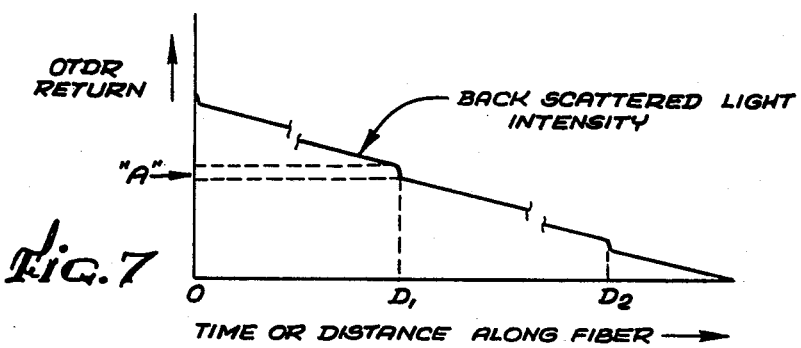
FIG. 7 is a graphical representation of detected optical information when one or more of the microbend transducers are in an active position, as illustrated with respect to the microbend transducer shown in FIG. 6.

When one of the microbend transducers 14 responds to stress acting upon the pipeline 12, the transducer moves from an inactive position as viewed in FIG. 2 to an active position as viewed in FIG. 6 to induce a microbend into the fiber resulting in a loss of a detectable portion of the transmitted and backscattered light at the microbend. More specifically, a portion of the transmitted and backscattered light is scattered from the fiber core 52 into the fiber cladding 54 for escape from the fiber to the surrounding environment. This abrupt loss of backscattered light is sensed by the photodetector 56 as a pronounced drop in backscattered light intensity at the longitudinal position corresponding with the location of the microbend. This intensity attenuation is illustrated in FIG. 7 at distnce "$D_1$", along the length of the fiber wherein the magnitude of the attenuation, referred to by the letter "A" in FIG. 7, corresponds directly with the magnitude of the pipeline strain whereby the output of the photodetector can be scaled to provide a direct reading of strain magnitude.

The optical fiber system 10 described hereinabove is uniquely suited for monitoring pipeline strain from a single monitoring station, since the optical time domain reflectometer 18 simultaneously monitors the plurality of microbend transducers 14. That is, with reference to FIG. 7, the detection of stress at position "$D_1$", by one tranducer does not block backscattered light reflected from downstream positions of the fiber. Accordingly, the photodetector 56 provides an output which can simultaneously indicate the location and magnitude of a second or additional stress acting upon the pipeline, such as stress causing activation of a transducer 14 at a downstream position "$D_2$" as illustrated in FIG. 7.

According to a major aspect of the system 10, the sensitivity and accuracy of the photodetector output is advantageously and significantly improved by the provision of means for stripping from the fiber cladding 54 all light that is scattered to the cladding 54 as a result of microbending of the fiber. This stripping means, or mode stripper, is positioned directly at the microbend of each microbend transducer 14 for immediate stripping of this light in order to prevent propagation of the light along the cladding where it is subject to partial reflection or transmission back into the fiber core 52.

One preferred form of the mode stripper is illustrated in FIG. 6 as a refracting substance 58 trapped between the facing surfaces of the transducer blocks 20 and 22 to circumferentially surround the optical fiber 16. This substance 58 may be provided either in liquid or solid form to have an index of refraction generally matching or greater than the index of refraction of the fiber cladding 54 to permit easy transfer thereinto of light from the cladding. One preferred refracting substance 58 comprises liquid glycerin which does not restrain bending movement of the fiber but which has a sufficient viscosity such that it does not easily flow from the narrow passage 34 between the transducer blocks. Importantly, the refracting substance 58 has an optically irregular exterior surface configuration whereby the light transmitted into the substance tends to be absorbed and lost without reflection back into the fiber cladding 54.

Alternatively, if desired, the mode stripper can be provided in the form of an optically black surface coating formed directly on the fiber 16 at the microbend and in the vicinity of the transducer blocks 30 and 32. With this arrangement, the optically black coating surface absorbs the light immediately from the fiber cladding 54 to prevent retransmission of light from the cladding back into the fiber core 52. Reflection of any portion of the light from the cladding back into the core is thus prevented.

The system 10 thus provides apparatus and method for simultaneous monitoring from a single monitoring station of a large number of microbend transducers installed at remote positions on a pipeline or other structure along the length of a single optical fiber. The particular length of the pipeline which can be monitored is related to the intensity of the light source 46 and the transmission characteristics of the fiber 16. The monitored length is additionally related to the number of microbend transducers 14 installed along the fibers, since each transducer in series is capable of partially attenuating the light signal.

In a typical operating environment, the system is adaptable for use in measuring stress acting upon an oil or gas pipeline wherein the stress causes the pipeline to move slightly from a linear geometry to a nonlinear geometry having a curvature on the order of about two hundred microradians per foot. Each microbend transducer 14 can be sized to have a total length on the order of about one foot whereby a pipeline curvature of about two hundred microradians per foot or more will result in relative movement of the two transducer blocks toward each other by about 5–10 micrometers. While this movement is not visibly discernable, it results in a detectable microbend of the fiber wherein the amplitude of this detectable microbend will be directly proportional to the magnitude of stress acting on the pipeline.

In some applications of the system of this invention, it is desirable to monitor a length of a pipeline 12 or the like in excess of the length which can be monitored by use of a single optical fiber 16. To this end, alternative system arrangements are illustrated graphically in FIGS. 8 and 9 wherein plural optical fibers each associated with a plurality of microbend transducers are combined into an integrated system capable of monitoring by use of a single optical time domain reflectometer.

Figure 8:
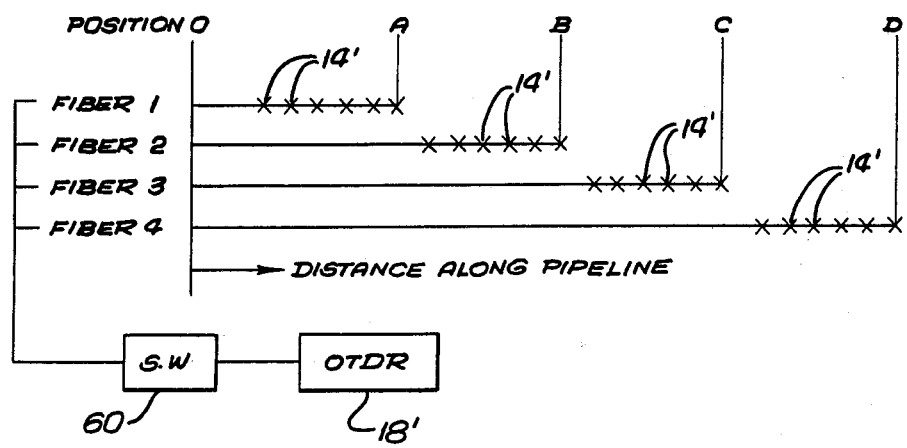

The system arrangement of FIG. 8 depicts the combination of four optical fibers 1-4 for installation along the length of a pipeline wherein distances along the pipeline are designated by the letters "A" through "D". Each one of the fibers 1-4 is associated in series with a plurality of microbend transducers 14' which can be mounted on the pipeline for response to pipeline strain in the same manner as described above with respect to FIGS. 1-7. The particular number of microbend transducers 14' associated with each fiber 1-4 corresponds with the maximum number of transducers which can be monitored along that fiber.

The four fibers 1-4 are collectively associated with a single optical time domain reflectometer 18' (OTDR) which includes a light source (not shown) for generating a pulsed light signal and a photodetector (also not shown) for detecting as a time function the reflected backscattered light intensity. However, in the system arrangement shown, the reflectometer 18' is coupled in sequence by a switching device 60 to the four fibers such that the reflectometer monitors the fibers one at a time in relatively rapid succession. Alternatively, if desired, the light signal can be launched simultaneously into each of the four fibers. Since the normal light signal attenuation along the length of each fiber is relatively low, except for attenuation introduced by the microbend transducers when sensing stress, some of the fibers 1-4 can travel a substantial distance along the pipeline prior to association with the respective transducers. Thus, as illustrated, the fiber 1 can be associated with a set of transducers near the reflectometer whereas the fibers 2-4 can be associated with sets of transducers positioned progressively further from the reflectometer, resulting in a substantial increase in the length of pipeline which can be monitored from the single monitoring station. Of course, the depiction of four fibers in FIG. 8 is illustrative only; any number of fibers can be provided as needed.

The alternative system arrangement of FIG. 9 also illustrates use of a plurality of fibers 1-4 for installation along the length of a pipeline or the like wherein distances from the optical time domain reflectometer 18' (OTDR) at a monitoring station are again designated by the letters "A" through "D". The fibers 1-4 are each associated with a plurality of the microbend transducers 14', and the reflectometer 18' monitors the active or inactive states of these transducers simultaneously, or in sequence, by sequential coupling to the fibers with the switching device 60. However, in this system arrangement, the microbend transducers 14' along the various fibers are longitudinally staggered, or interleaved, whereby the overall length of each fiber 1-4 is roughly the same. Alternatively, the transducers 14' of the plurality of fibers can be installed at different circumferential positions about the pipeline for monitoring the presence of forces acting in different directions. In either event, the photodetector of the reflectometer 18' can be calibrated generally at the same gain level for monitoring all of the fibers, whereas in the embodiment of FIG. 8 an adjustment in gain level may be required as the reflectometer is switched from one fiber to another.

According to further embodiments of the system, an alternative design for a microbend transducer is illustrated in FIGS. 10-12, wherein a modified microbend transducer 114 includes means for preventing excessive bending of an optical fiber 116 in response to high levels of stress or the like acting upon a pipeline 112. In this manner, excessive stresses on the fiber are prevented to correspondingly prevent breakage of the fiber which would render the monitoring system inoperative.

As viewed in FIGS. 10-12, the modified microbend transducer 114 comprises an elongated flexible beam 120 secured along its length to the pipeline 112 and including at its opposite ends a pair of supports 122 which receive fastening screws 128 for mounting of a rigid beam 124. The two beams 120 and 124 support a pair of transducer blocks 130 and 132 in closely spaced relation wherein the blocks include transversely extending pins 140 and 142 for movement into engagement with the optical fiber 116. To this extent, the construction and operation of the transducer 114 is the same as the transducer 14 described hereinabove. Accordingly, when stress acts upon the pipeline 112 in the localized region of the transducer 114, the flexible beam 120 moves from the linear configuration, as viewed in FIG. 10, to a curved configuration, as viewed in FIG. 12, resulting in engagement of the fiber 116 by the transducer pins 140 and 142 to induce microbending of the fiber.

The amplitude of fiber microbending is limited by a plurality of stops which maintain the flexible and rigid beams 120 and 124 in at least a minimum spacing from each other. These stops are provided in the form of pairs of lugs 62 depending downwardly from the rigid beam 124 at the upstream and downstream ends of the transducer blocks. Conveniently, as viewed in FIG. 11, each pair of lugs 62 is transversely spaced from each other for passage therebetween of the fiber 116, whereby the lugs assist in retaining the fiber within the transverse limits of the transducer blocks 130 and 132.

When the transducer 114 is in an inactive state, the lugs 62 are vertically spaced from the flexible beam 120 to permit at least some relative movement of the two beams toward each other. However, when the transducer 114 is in an active state during a condition of strain on the pipeline, the lugs 62 engage the flexible beam 120 upon sufficient movement of the beams toward each other to prevent further increase in the amplitude of fiber microbending to prevent risk of fiber breakage. This maximum permitted bending amplitude can be calibrated by appropriate adjustment of the initial spacing between the beams, as described with respect to FIGS. 2 and 3, whereby further bending of the fiber is prevented when the stress acting upon the pipeline reaches a defined threshold requiring remedial action to relieve the stress.

Another embodiment of a microbend transducer for use with the system is shown in FIGS. 13 and 14. In this design, a modified transducer 214 comprises an inner beam or lever 64 having one end secured to a pipeline 212 or the like as by welding. From the mounting point, the lever 64 extends longitudinally along the pipeline in spaced relation therewith and terminates at a free end having an upwardly presented corrugated profile defining a lower transducer block 230.

The lower transducer block 230 is spaced slightly from an upper or outer transducer block 232 supported by one or more uprights 68 which is in turn joined to a lower plate 70 fastened to the pipeline 212 as by welding. This latter transducer block 232 has a downwardly presented corrugated profile cooperating with the transducer block 230 to define a relatively narrow passage for reception of an optical fiber 216. As illustrated, the lower transducer block 230 carries a pair of transversely extending pins 240 positioned in a longitudinally staggered relation with similar pins 242 carried by the upper transducer block 232, whereby the pins 240 and 242 define teeth for microbending the fiber 216 when the transducer blocks are moved toward each other.

In a normal or inactive position when the pipeline 212 is not subject to stress, the transducer blocks 230 and 232 are sufficiently spaced from each other to avoid microbending of the fiber. However, when the pipeline experiences stress, the pipeline moves to a gradually curved geometry as illustrated in FIG. 14 whereby relative displacement occurs between the fixed end of the lever 64 and the upper transducer block 232 for movement of the two transducer blocks 230 and 232 toward each other. This relative movement results in microbending of the fiber which can be located and quantified as described hereinabove. Mode stripper 258, shown illustrated in the form of liquid glycerin, is advantageously provided between the transducer blocks the prevent any portion of the light leaving the core of the fiber from being retransmitted back into the core.

Still another alternative embodiment for a microbend transducer is illustrated in FIG. 15 for use in the system of this invention. In this embodiment, the system utlilizes an optical fiber cable 71 including a fiber 316 encased within a sheathing 72 for protection of the fiber from a hostile environment. The illustrated microbend transducer 314 is incorporated in part into the sheathing for microbending of the fiber in response to stress activity along the pipeline.

More specifically, the modified transducer 314 comprises a generally U-shaped bridge 74 oriented in a generally inverted position with its opposite legs 76 secured to the pipeline 312 or the like as by welding. The legs 76 each include holes 78 for passage therethrough of the fiber cable 71. A pair of transducer blocks 80 and 82 are encased within the sheathing 72 generally on opposite sides of the fiber 316 at a longitudinal position generally coinciding with a midpoint of the bridge 74. These transducer blocks 80 and 82 include complementary facing surfaces 81 and 83 having a relatively gentle sinusoidal or corrugated shaped curvature for engaging the opposite sides of the fiber. These surfaces 81 and 83 can be formed in any suitable manner, such as by machining, etching, or the like.

A bearing block 84 depends generally from the midpoint of the transducer bridge 74 to retain against the pipeline 312 the portion of the cable 71 containing the transducer blocks 80 and 82. With this arrangement, when the pipeline 312 is subjected to a stress condition, the pipeline assumes a gradual radius of curvature to move slightly toward the bearing block 84 of the bridge 74. This movement compresses the transducer blocks 80 and 82 against the fiber 316 to induce microbending of the fiber according to the configuration of the curved block surfaces 81 and 83. This microbending of the fiber is monitored as described above to provide an indication of the location and magnitude of stress.

An additional alternative embodiment for a microbend transducer 414 is depicted in FIG. 16. As illustrated, an optical fiber 416 is once again contained within a protective sheating 472 to form a fiber optic cable 471, but in this embodiment a relatively rigid wire 90 or the like is spirally wound about the fiber 416 between the sheathing 472 and the fiber. The longitudinal spacing of each wrap of the wire is chosen to be on the order of a few millimeters such that transverse compression of the cable 471 induces microbending of the fiber 416.

The fiber cable 471 extends longitudinally through a generally U-shaped bridge 474 which is secured to a pipeline 412 or the like in an inverted position as by welding of its opposite legs 476 to the pipeline, generally in the same manner as described with respect to the bridge 74 in FIG. 15. This bridge 474 further includes a downwardly depending bearing block 484 which retains the cable 471 in bearing engagement with the exterior of the pipeline. Accordingly, when the pipeline moves to a curved configuration during a condition of strain, the cable is compressed between the block 484 and the pipeline to induce microbending of the fiber 416.

Figure 17:
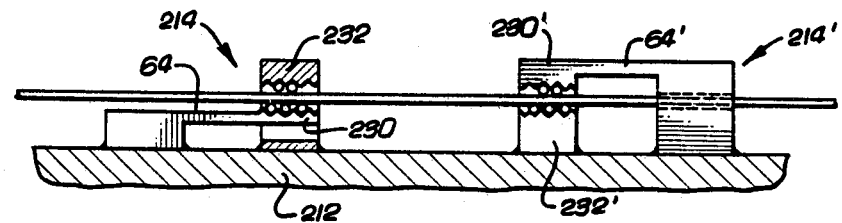
FIG. 17 is a fragmented side elevation view of a modified system arrangement illustrating a plurality of microbend transducers installed in cascaded relation along the length of a structure wherein the transducers are adapted for response to movement of the structure in different directions.

An additional system arrangement of the invention is illustrated in FIG. 17 wherein microbend transducers adapted for response to forces acting in different directions along a structure are positioned in a closely spaced cascade relation. More specifically as illustrated, a microbend transducer 214 identical to that shown and described hereinabove in FIGS. 13 and 14 is installed along the length of a pipeline 212 or the like for inducing microbending of an optical fiber 216 in response to upward movement or strain of the pipeline. However in some environments, the pipeline may also experience downward movement as a result of forces acting thereupon, whereby a modified microbend transducer 214' is provided on top of the pipeline for response to such downward movement.

The modified transducer 214' includes a first transducer block 232' secured to the pipeline 212 in facing relation with a second transducer block 230' carried at the free end of a cantilevered beam 64' secured to the pipeline. These transducer blocks 232' and 230' are generally identical with the transducer blocks 230 and 232 of the transducer 214, except that they are reversed in the radial direction for movement away from each other in response to upward movement of the pipeline. Accordingly, the transducer blocks 232' and 230' are moved toward each other in response to downward movement of the pipeline. The two transducers 214 and 214' thus permit simultaneous monitoring of localized forces acting in more than one direction upon the structure. Of course, if desired, additional modified transducers can be provided for response to forces acting in the horizontal direction.

Figure 18:
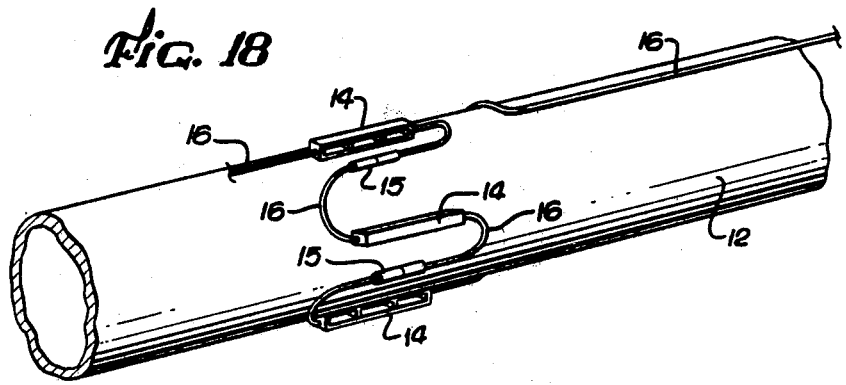
FIG. 18 is a fragmented perspective view illustrating a further modified system arrangement having sets of microbend transducers for response to forces acting in different directions upon a structure, including position indicators disposed along the fiber between the individual transducers.
Figure 19:
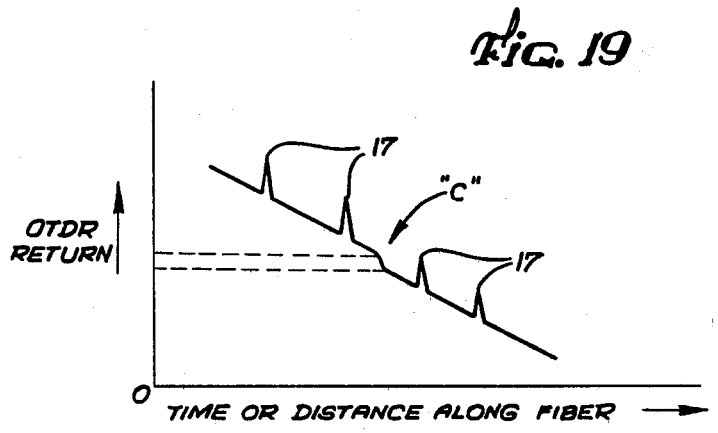
FIG. 19 is a graphical representation of detected optical information when one of the transducers in the system arrangement of FIG. 18 is in an active position.

A further modified system arrangement is illustrated in FIGS. 18 and 19 to include position indicators which permit precise identification of the microbend transducer inducing microbending of the fiber. As illustrated, a plurality of microbend transducers 14, such as, for example, the type shown and described in FIG. 2, are installed on a structure such as a pipeline 12. These transducers 14 can be mounted at longitudinally spaced positions, or they can be provided in sets as shown wherein each set includes a plurality of transducers mounted circumferentially about the pipeline for detecting the presence of forces acting in different directions. The optical fiber is thus threaded through each transducer of each set such that the system is capable of monitoring forces acting in several directions at a plurality of locations along the length of the pipeline.

In this arrangement, the position indicators comprise optical elements interposed between the transducers 14 of each set to provide a unique variation in the intensity of backscattered light reflected to the photodetector. In this manner, the individual monitoring the photodetector output can determine easily which transducer in the set is responding to a force on the pipeline and thereby identify the location, magnitude, and direction of the force.

In a preferred form, each position indicator comprises a coupler 15 interposed between a pair of the transducers. This coupler 15 is relatively conventional in form and is provided for rejoining the fiber 16 subsequent to a cut by means of an epoxy, fusion splicing, or the like. Importantly, a substantial portion of the light passing through the splice within the coupler 15 is reflected back to the point of origin whereby the photodetector output as viewed in FIG. 19 includes a plurality of reflection spikes 17 corresponding to the locations of the coupler 15 of each set of transducers. An attenuation in backscattered light intensity, as illustrated at "C" in FIG. 19, indicates detection of force by a particular one of the transducers 14 to indicate the direction of the force according to a knowledge of the order in which the fiber is threaded through the set of transducers.

The couplers 15 are further useful in periodic calibration of the system to permit accurate monitoring of force magnitude over relatively long periods of time. That is, transmissivity of the fiber may deteriorate slowly over time, whereby the detected attenuation for a given microbend amplitude may decrease slightly over time. However, by noting the magnitude of reflection from one of the couplers 15 when the system is initially installed, such as by forming the coupler to have a predetermined reflecting capability, a constant is introduced into the photodetector output for comparison with attenuations induced by the microbend transducers.

The optical fiber microbending system of this invention thus provides a practical and effective optical arrangement for remote detection of structural forces such as strain in an elongated structure such as an oil or gas pipeline. The forces occurring at a plurality of points along the structure are simultaneously monitored both positionally and quantitatively by use of a single monitoring device located at a convenient monitoring station. The various microbend transducers disclosed comprise simple, inexpensive devices ideally suited for use in remote, hostile environments. All of these transducers can be combined with the disclosed mode stripper either in the form of a substance having the desired index of refraction or an absorptive black surface for enhancing system sensitivity and accuracy.

Various modifications and improvements to the invention described herein are believed to be apparent to one skilled in the art. For example, the bending teeth of the various microbend transducers shown and described can be formed by any convenient method or process. Moreover, if desired, the disclosed transducers can be encased within protective housings for further protection from adverse environmental conditions. Accordingly, no limitation upon the invention is intended, except as set forth in the appended claims.

We claim:

1. A system for monitoring forces acting upon a structure, comprising:
    a plurality of optical fibers extending along the structure;
    a plurality of sets of force transducers wherein each of said sets is operatively associated with a respective one of said fibers and wherein each of said transducers is mounted on the structure for movement in response to a localized force acting upon the structure to induce microbending of its associated fiber wherein light passing through each of said fibers is abruptly attenuated at each microbend therein;
    means for launching a pulsed optical signal into said fibers for passage therethrough and for substantially continuous reflection along the lengths of said fibers of a portion of said signal back through said fibers as backscattered light; and
    means for detecting the intensity of said backscattered light from each of said fibers as a function of time of reflection whereby each microbend along each fiber is indicated by an abrupt attenuation in said detected intensity and the time of detection is indicative of the location of the microbend along said fiber;
    said signal launching means and said detecting means being positioned at a common monitoring station, said signal launching means comprising a light source and said detecting means comprising a photodetector, and including optical means positioned generally adjacent one end of said fibers for direction of said pulsed optical signal into said fibers and for direction of said backscattered light to said photodetector.

2. The system of claim 1 wherein said means for launching said pulsed optical signal comprises a laser light source.

3. The system of claim 1 wherein said launching means includes means for launching said pulsed light signal sequentially into said plurality of fibers.

4. The system of claim 1 wherein said force transducers are mounted at selected positions spaced longitudinally along the length of the structure.

5. The system of claim 1 wherein said sets of transducers are mounted in respective groups along the length of the structure.

6. The system of claim 1 wherein said transducers of said sets of transducers are mounted at longitudinally staggered positions along the length of the structure.

7. The system of claim 1 wherein said force transducers are mounted for response to forces acting in different directions upon the structure.

8. The system of claim 1 wherein each of said transducers is mounted on the structure for inducing microbending of said fiber with an amplitude proportional to the magnitude of the force acting upon the structure.

9. A method of monitoring stress acting upon a pipeline, comprising the steps of:
    providing a plurality of optical fibers to extend from a monitoring station along the pipeline;
    mounting a plurality of sets of strain transducers wherein each of said sets is in operative association with a respective one of the fibers and wherein each of the transducers is mounted on the pipeline for movement in response to a localized stress acting upon the pipeline to induce microbending of its associated fiber wherein light passing through each of the fibers is abruptly attenuated at each microbend therein;
    launching a pulsed optical signal from the monitoring station into the fibers for passage therethrough and for substantially continuous reflection along the lengths of said fibers of a portion of the signal back through the fibers as backscattered light; and
    detecting at the monitoring station the intensity of the backscattered light from each of the fibers as a function of time of reflection whereby each microbend along each fiber is indicated by an abrupt attenuation in the detected intensity and the time of detection is indicative of the location of the microbend along the fiber.

10. A system for monitoring stress acting upon a structure, comprising:
   a plurality of optical fibers extending along the structure;
   a plurality of sets of strain transducers wherein each of said sets is operatively associated with a respective one of said fibers and wherein each of said transducers is mounted on the structure for movement in response to a localized stress acting upon the structure to induce microbending of its associated fiber wherein light passing through each of said fibers is abruptly attenuated at each microbend therein;
   means for launching a pulsed optical signal into said fibers for passage therethrough and for substantially continuous reflection along the lengths of said fibers of a portion of said signal back through said fibers as backscattered light; and
   means for detecting the intensity of said backscattered light from each of said fibers as a function of time of reflection whereby each microbend along each fiber is indicated by an abrupt attenuation in said detected intensity and the time of detection is indicative of the location of the microbend along said fiber;
   said signal launching means and said detecting means being positioned at a common monitoring station, said signal launching means comprising a light source and said detecting means comprising a photodetector, and including optical means positioned generally adjacent one end of said fibers for direction of said pulsed optical signal into said fibers and for direction of said backscattered light to said photodetector.

11. The system of claim 10 wherein said launching means comprises means for coupling said light source and said photodetector in sequence to said plurality of fibers.

12. The system of claim 10 wherein said sets of transducers are mounted in respective groups along the length of the structure.

13. The system of claim 10 wherein said transducers of said sets of transducers are mounted at longitudinally staggered positions along the length of the structure.

14. A system for monitoring stress acting upon a pipeline, comprising:
   a plurality of optical fibers extending along the pipeline;
   a plurality of sets of strain transducers wherein each of said sets is operatively associated with a respective one of said fibers and wherein each of said transducers is mounted on the pipeline for movement in response to localized stress acting upon the pipeline to induce microbending of its associated fiber wherein light passing through each of said fibers is abruptly attenuated at each microbending therein;
   means for launching a pulsed optical signal into said fibers for passage therethrough and for substantially continuous reflection along the lengths of said fibers of a portion of said signal back through said fibers as backscattered light; and
   means for detecting the intensity of said backscattered light from each of said fibers as a function of time of reflection whereby each microbend along each fiber is indicated by an abrupt attenuation in said detected intensity and the time of detection is indicative of the location of the microbend along said fiber;
   said signal launching means and said detecting means being positioned at a common monitoring station, said signal launching means comprising a photodetector, and including optical means positioned generally adjacent one end of said fibers for direction of said pulsed optical signal into said fibers and for direction of said backscattered light to said photodetector.

15. The system of claim 14 wherein said launching means comprises means for coupling said light source and said photodetector in sequence to said plurality of fibers.

16. The system of claim 14 wherein said sets of transducers are mounted in respective groups along the length of the pipeline.

17. The system of claim 14 wherein said transducers of said sets of transducers are mounted at longitudinally staggered positions along the length of the pipeline.

18. The system of claim 14 wherein said strain transducers are mounted at selected positions spaced longitudinally along the length of the pipeline.

19. The system of claim 14 wherein said signal launching means and said detecting means are positioned at a common monitoring station.

20. A method of monitoring forces acting upon a structure, comprising the steps of:
   providing a plurality of optical fibers to extend from a monitoring station along the structure;
   mounting a plurality of sets of force transducers wherein each of said sets is in operative association with a respective one of said fibers and wherein each of the transducers is mounted on the structure for movement in response to a localized force acting upon the structure to induce microbending of its associated fiber wherein light passing through each of the fibers is abruptly attenuated at each microbend;
   launching a pulsed optical signal from the monitoring station into the fibers for passage therethrough and for substantially continuous reflection along the lengths of said fibers of a portion of the signal back through the fibers as backscattered light; and
   detecting at the monitoring station the intensity of the backscattered light from each of the fibers as a function of time of reflection whereby each microbend along each fiber is indicated by an abrupt attenuation in the detected intensity and the time of detection is indicative of the location of the microbend along the fiber.

21. The method of claim 20 wherein said launching step comprises launching the pulsed light signal sequentially into the plurality of fibers.

22. The method of claim 20 including positioning a light source and a photodetector at a common mounting station, and coupling the light source and the photodetector in sequence to the plurality of fibers.

23. The method of claim 20 including mounting the sets of transducers in respective groups along the length of the structure.

24. The method of claim 20 including mounting the transducers of said sets of transducers at longitudinally staggered positions along the length of the structure.

25. The method of claim 20 including mounting the transducers at selected positions spaced longitudinally along the length of the structure.

26. The method of claim 20 including mounting each of the transducers on the structure for inducing microbending of the fiber with an amplitude proportional to the magnitude of the force acting upon the structure.

27. The method of claim 20 including mounting the transducers on the structure for response to forces acting in different directions on the structure.

* * * * *